(12) United States Patent
Nishi

(10) Patent No.: US 6,681,395 B1
(45) Date of Patent: Jan. 20, 2004

(54) TEMPLATE SET FOR GENERATING A HYPERTEXT FOR DISPLAYING A PROGRAM GUIDE AND SUBSCRIBER TERMINAL WITH EPG FUNCTION USING SUCH SET BROADCAST FROM HEADEND

(75) Inventor: Hiroyuki Nishi, Tokyo (JP)

(73) Assignee: Matsushita Electric Industrial Company, Ltd., Osaka (JP)

( * ) Notice: Subject to any disclaimer, the term of this patent is extended or adjusted under 35 U.S.C. 154(b) by 0 days.

(21) Appl. No.: 09/271,383

(22) Filed: Mar. 18, 1999

(30) Foreign Application Priority Data

Mar. 20, 1998 (JP) .......................................... 10-090657

(51) Int. Cl.[7] .............................................. H04N 5/445
(52) U.S. Cl. ............................ 725/45; 725/50; 725/132
(58) Field of Search ............................... 725/39, 40, 43, 725/44, 47, 50, 52, 53, 54, 134, 132, 140, 152; 348/906; 345/716, 719; H04N 7/16, 7/173, 5/445

(56) References Cited

U.S. PATENT DOCUMENTS

| 5,559,549 A | 9/1996 | Hendricks et al. |
| 5,579,055 A | * 11/1996 | Hamilton et al. ............. 725/49 |
| 5,673,401 A | 9/1997 | Volk et al. |

FOREIGN PATENT DOCUMENTS

| EP | 0735749 | 10/1996 |
| EP | 0810579 | 12/1997 |
| EP | 0827340 | 3/1998 |
| JP | 9-37167 | 2/1997 |
| WO | 9413107 | 6/1994 |
| WO | 9414282 | 6/1994 |

* cited by examiner

Primary Examiner—Chris Grant
(74) Attorney, Agent, or Firm—Lowe Hauptman Gilman & Berner, LLP

(57) ABSTRACT

A program guide display system that utilizes a set of hierarchical templates broadcast from a broadcasting station. The set includes a plurality of frame templates and component templates to be embedded in the frame templates. If a user issues a program guide request while viewing a program of a channel, a form of program guide is determined. One of the frame templates which one is suitable to the form is selected. A text describing the program guide of the form is generated by embedding necessary one(s) of the component templates in the selected frame template while substituting variables of the selected and necessary templates with data which are determined by display conditions and obtained from program information broadcast from the broadcasting station. The generated text is passed to means for executing the text to display program guide.

40 Claims, 10 Drawing Sheets

SOFTWARE STORED IN THE CONTROLLER 45

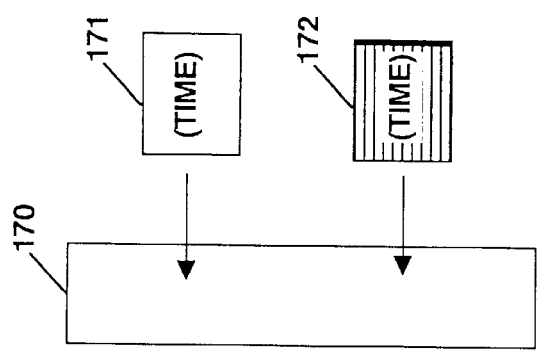
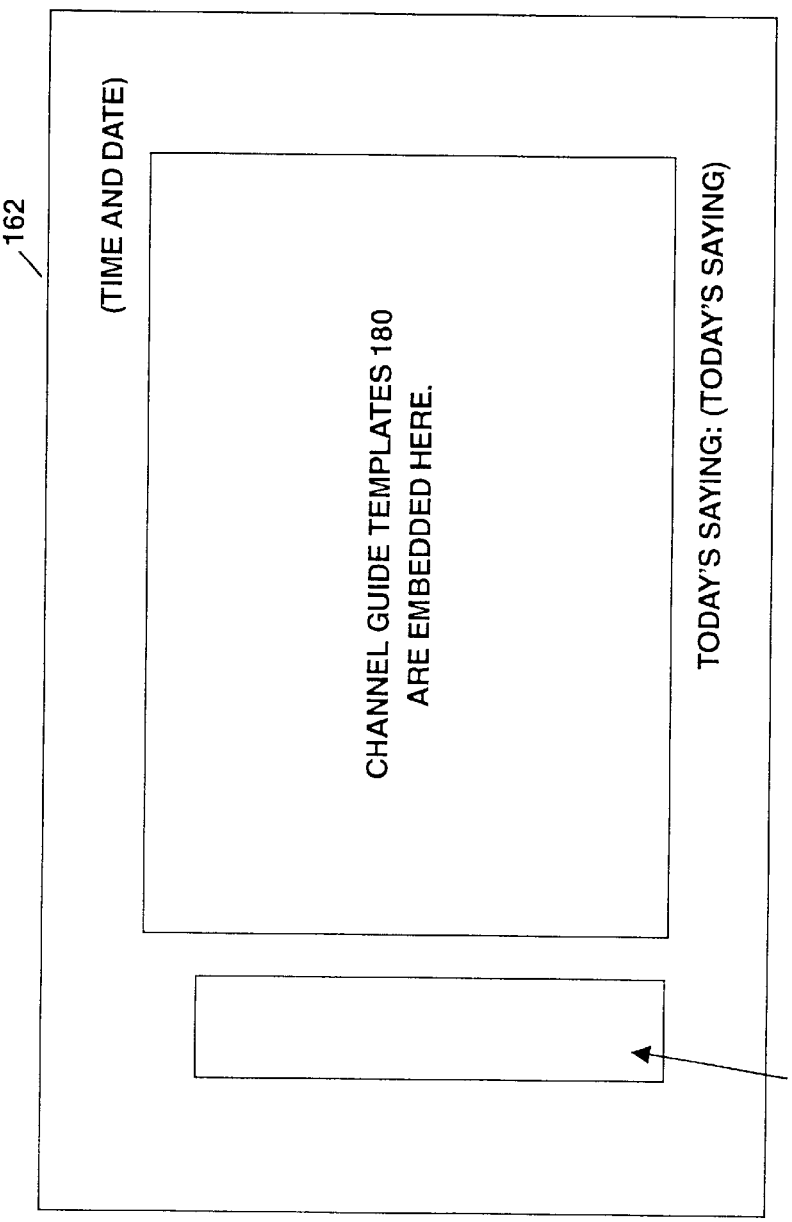

FIG. 8

| CHANNEL No. /91 | NAME /93 | yyy (TYPE OF CHANNEL NAME TEMPLATE) /95 | ARGUMENTS (T or "actual data", L, and/or I) 90 /97 | ... |
|---|---|---|---|---|
| 0001 | CHANNEL 1 | 00k | N | ... |
| 0002 | J-Sports | 050 | I | ... |
| 0003 | Russia TV | 05f | RTV | ... |
| 0004 | CHANNEL 4 | 00b | N | ... |
| ⋮ | ⋮ | ⋮ | ⋮ | ⋮ |

THE VALUE "yyy" IS FOR TEMPLATE ID "chname_yyy."

FIG. 9A

PROGRAM INFORMATION TABLE 100

| | |
|---|---|
| CHANNEL (or SERVICE) No. | /91 |
| PROGRAM (or EVENT) No. | /92 |
| PROGRAM TITLE | /101 |
| BROADCAST TIME & DATE | /93 |
| DURATION | /94 |
| SUBTITLE (OPTIONAL) | /102 |
| CATEGORY CODE | /103 |
| SUBCATEGORY CODE (OPTIONAL) | /104 |
| DETAIL 1 (OPTIONAL) | /105 |
| DETAIL 2 (OPTIONAL) | /106 |
| DETAIL 3 (OPTIONAL) | /107 |
| · (DETAILS 4, 5...) · | /108 |
| RATING (OPTIONAL) | /109 |
| · (OTHERS) · | |

FIG. 9B

PROGRAM INFORMATIN TABLE 100

| TITLE | ... | SUBTITLE | CATEGORY | SUBCATE-GORY | DETAIL 1 | DETAIL 2 | DETAIL3 | ... | RATING | ... |
|---|---|---|---|---|---|---|---|---|---|---|
| Soccor | ... |  | SP | 17 | AAA vs. ZZZ | BBB Stadium | Atlanta Georgia | ... |  | ... |
| World Cup Ski | ... | Women's Slalom | SP | 25 | XXXX Resort | Cairo Egypt |  | ... |  | ... |
| Monochrome Movie | ... | The Future | MV | 03 | 1995 | S. Spellburg | R. Regon J. Bush | ... |  | ... |
| Beyond the News | ... | A Hospital | DO | 06 | 1999 | ABCDE | FGHIJ | ... |  | ... |
| Sports News | ... |  | NS | 03 |  |  |  | ... |  | ... |
| Financial News | ... |  | NS | 04 |  |  |  | ... | ... |  |
| ... | ... | ... | ... | ... | ... | ... |  | ... |  |  |

101  102  103  104  105  106  107  109

| CATEGORY (CODE) | SUBCATEGORY (CODE) | SUBCATEGORY NAME | zzz | FAVORITE |
|---|---|---|---|---|
| . . . | | | | |
| DO | 06 | DOCUMENTARY | 123 | |
| . . . | | | | |
| MV | 03 | MOVIE H | 023 | |
| . . . | | | | |
| NS | 03 | FINANCIAL NEWS | 008 | |
| NS | 04 | SPORTS NEWS | 008 | |
| . . . | | | | |
| SP | 17 | SOCCER | 052 | F |
| . . . | | | | |
| SP | 25 | SKI | 046 | |
| . . . | | | | |

| NAME | AGE | SEX | ADDRESS 1 (AREA) | ADDRESS 2 | HOBBY | · · · |
|---|---|---|---|---|---|---|

TEMPLATE SET FOR GENERATING A HYPERTEXT FOR DISPLAYING A PROGRAM GUIDE AND SUBSCRIBER TERMINAL WITH EPG FUNCTION USING SUCH SET BROADCAST FROM HEADEND

BACKGROUND OF THE INVENTION

1. Field of the Invention

The invention generally relates to a multimedia TV broadcasting system and, more specifically, to a method of and a system for displaying a sophisticated electronic program guide by using structured templates transmitted from a center equipment and to a subscriber terminal incorporating such a method or program.

2. Description of the Prior Art

What we call "a multimedia broadcasting system" is a broadcasting system in which each of the broadcast programs comprises at least one video, at least one audio and/or text data. Among such multimedia broadcasting system, there are digital TV broadcasting systems according to standards, known as MPEG-2 (Moving Picture Experts Group—phase 2), DVB (Digital Video Broadcasting), etc. and analog TV systems such as a multiplexed analog component (MAC) TV system. Generally, such a multimedia broadcasting system tends to provide an increased number of channels, making it difficult for a subscriber to select a program to watch or to record. For this, multimedia broadcasting systems usually broadcast EPG (Electronic Program Guide) data as well as program data. This permits the user to display a program guide on the display screen of a user's terminal, if it is a TV set, or of a TV set connected with a set-top terminal and to select a desired one from the displayed program guide.

Various techniques of displaying a program guide have been devised so far.

For example, Japanese unexamined patent publication No. Hei8-140003 (1996) discloses a system that displays a menu of categories of programs on a display screen permitting the user to select a desired category and displays a program guide for programs in a category selected by the user.

Japanese unexamined patent publication No. Hei9-37167 (1997) discloses a device and method for controlling electronic program guide display. In this device, the user can select one of the standard or wide aspect ratios. Once an aspect ratio is selected, the device thereafter changes an arrangement of sample images in a program guide according to the selected aspect ratio.

In conventional terminals, program guides are displayed by a program guide-displaying program stored in the terminal. Accordingly, the formats of the displayed program guide are limited only to those supported by the program-displaying program.

It is difficult for the user to select desired program(s) from the displayed program guide in a form of a table of program cells which table has a plurality of channels listed in a first dimension and time listed in a second dimension because all the program cells in the table are uniformly displayed regardless of user's preference.

Since conventional terminals display program guides in the same way regardless of the size of the display screen, if the screen size is smaller than a certain size, characters of the displayed program guide are reduced too small in size to read.

SUMMARY OF THE INVENTION

The present invention is directed to solving these and other problems and disadvantages of the prior art.

According to one aspect of the invention, a set of hierarchical text templates broadcast from a broadcast station for use in displaying a program guide is provided. Program information is also broadcast from the broadcast station. The set of templates includes a plurality of frame templates; channel name templates of different types into which display manners of possible channels are classified, each channel name template being for displaying a channel name display section; and program templates for each displaying a program information for a single program, each program template being associated with one of categories into which possible programs are classified. The frame templates may include special frame templates, each being suited for a condition in which the special frame template is to be used. Each of the special frame templates includes a description of the condition.

Preferably, the set of templates include at least one intermediate template for describing a local layout of the program guide. Each intermediate template is embedded in one of the frame templates.

The intermediate templates preferably include a time-axis template for describing a section where hours specified by arguments passed from the one of the frame templates are displayed and a channel guide template for describing a section where program information for at least one channel specified by channel, channel count arguments and a plurality of hours specified by start and end time arguments is displayed in a table form.

Preferably, the frame templates further include a single-channel frame template for describing an overall layout of a single-channel program guide and a table-form frame template for describing an overall layout of a table-form program guide.

Preferably, the frame templates further include a category-form frame template for describing an overall layout of a program guide for programs in a category specified by a category argument supplied from external.

The set of templates further include a program ID template for displaying a channel name, a start time and an end time of a program. The program ID template is embedded in pairs with one of the program templates in the category-form frame template.

In one embodiment, the above-described templates are broadcast from the broadcasting station. However, the templates may be distributed stored in a IC card.

According to further aspect of the invention, a television subscriber system capable of displaying a program guide by using a set of hierarchical templates broadcast from a broadcasting station is provided. The set includes a plurality of frame templates and component templates to be embedded in the frame templates. The television subscriber system comprises software. The software includes means for permitting a user to issue a program guide request while viewing a program of a channel; means for determining a form of program guide in response to the program guide request; means, responsive to the determination, for selecting one of the frame templates which one is suitable to the form; means for generating a text describing the program guide of the form by embedding necessary one(s) of the component templates in the selected frame template while substituting variables of the selected and necessary templates with data which are determined by display conditions and obtained from program information broadcast from the broadcasting station; and means for executing the text to display program guide.

BRIEF DESCRIPTION OF THE DRAWING

The features and advantages of the present invention will be apparent from the following description of an exemplary embodiment of the invention and the accompanying drawing, in which:

FIGS. 4 through 6 are diagrams illustrating the way of describing the image 60 of FIG. 3 by using templates;

FIG. 8 is a diagram showing an exemplary structure of a table for associating each channel ID with the type "yyy" of the channel name template "chname_yyy" 181;

FIG. 9A is a diagram showing an exemplary structure of a program information table 100 formed by using program information (or EPG data) broadcast from the broadcasting station 2;

FIG. 9B is a diagram showing a part of the program information table 100;

Throughout the drawing, the same elements when shown in more than one figure are designated by the same reference numerals.

DETAILED DESCRIPTION OF THE PREFERRED EMBODIMENTS

Figure 1:
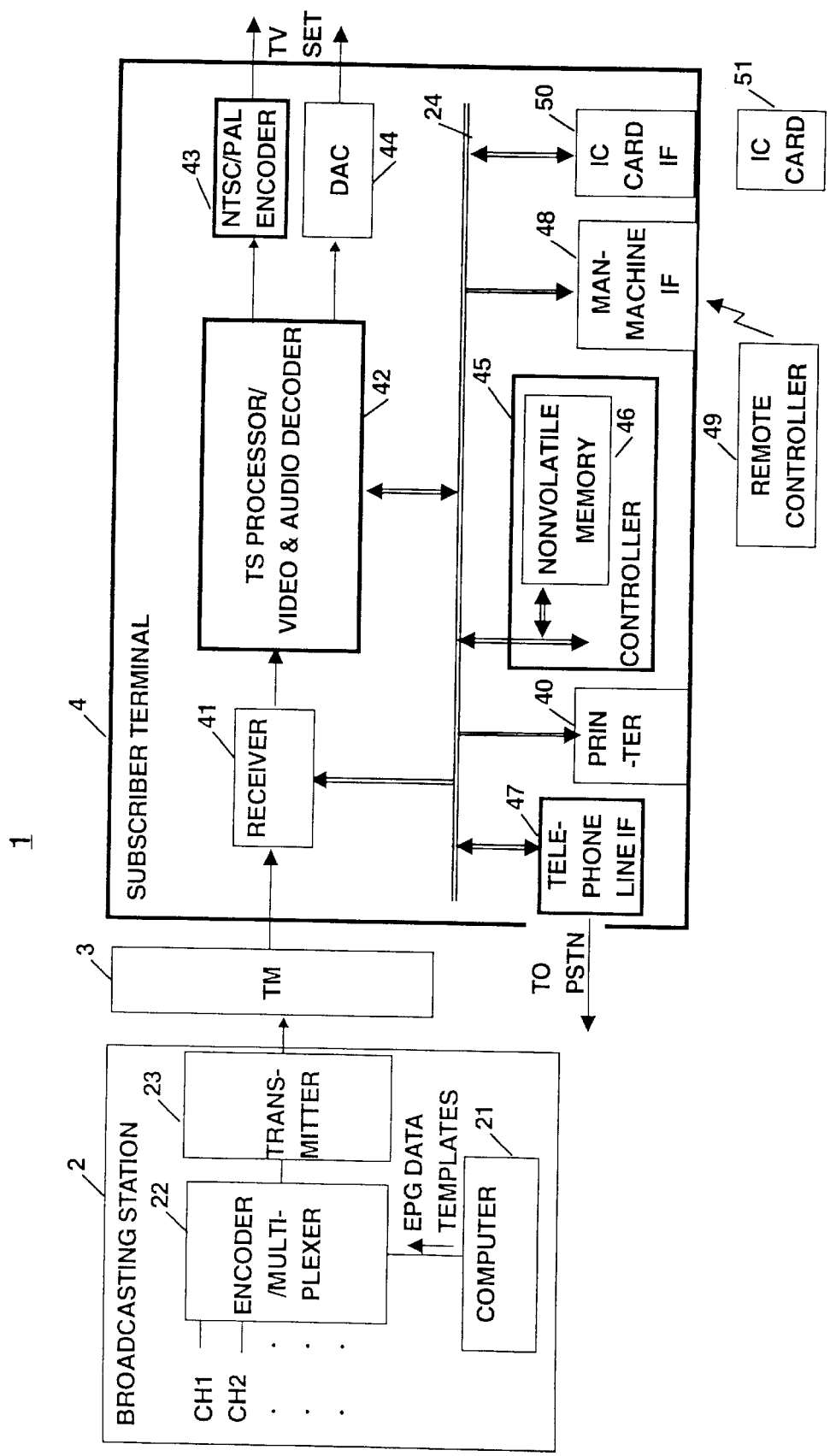
FIG. 1 is a schematic block diagram showing an exemplary arrangement of a broadcasting system capable of presenting a program guide at broadcaster's will in accordance with an illustrative embodiment of the invention.

FIG. 1 is a schematic block diagram showing an exemplary arrangement of a broadcasting system capable of presenting a program guide at broadcaster's will in accordance with an illustrative embodiment of the invention. In FIG. 1, the broadcasting system 1 comprises at least one broadcasting station 2, a transmission medium 3, and a multiplicity of subscriber terminal 4. The broadcasting station 2 may comprise any suitable broadcasting equipment that can broadcast not only video and audio but also various data including EPG (Electronic Program Guide) data. In this specific embodiment, the broadcasting station 2 comprises a computer 21 for preparing the EPG data and a variety of structured templates for use in displaying a program guide (detailed later), an MPEG-2 encoder/multiplexer 22 for encoding a plurality of channel data streams and for multiplexing the encoded channel data, the EPG data and the various templates into a transport stream (TS) defined in the MPEG-2 standard, and a transmitter 23 for broadcasting the transport stream.

The transmission medium 3 may be any of terrestrial air, satellites and cables.

The subscriber terminal 4 may be any suitable device capable of receiving and decoding the broadcast signal from the broadcasting station 2, e.g., a television receiver with such a capability, a set-top terminal connected with a television receiver, etc. In this specific embodiment, the subscriber terminal 4 is a set-top terminal comprising a receiver 41; a TS processor/video & audio decoder 42 having its input connected with a receiver 41 output; an NTSC/PAL encoder 43 having its input connected with a processor/encoder 42 video output and providing a video output for a subsequent television receiver (not shown); a digital-to-analog converter (DAC) 44 having its input connected with a processor/encoder 42 audio output and providing an audio output for the subsequent television receiver (not shown); a controller 45 for controlling the operation of the terminal 4; a telephone line interface (IF) 47 for informing a relevant center of billing information through a public switched telephone network (not shown); a man-machine interface 48 for permitting the user to controlling the terminal 4; an IC (integrated circuit) card interface 50 for read and write an IC card 51; and a printer 40. A remote controller 49 is preferably provided for facilitating the user controlling the terminal 4. The IC card stores information on channels the user is subscribing to, keys for use in decoding such subscribed channels and personal information of the user useful for the operation of the terminal 4. The controller 45 includes a nonvolatile memory 46 for storing the at least EPG data and the above-mentioned templates. The controller 45 optionally stores in the memory 46 possible users' (or family members') passwords and personal information.

Figure 2:
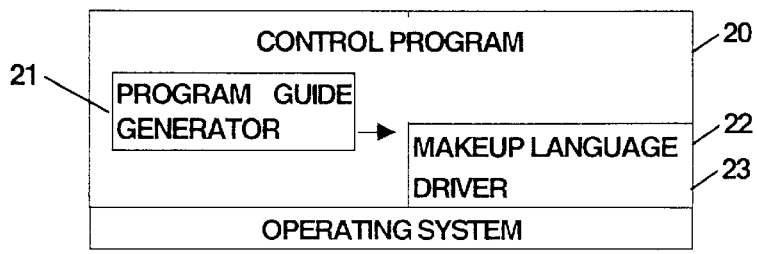
FIG. 2 is a diagram schematically showing an exemplary software configuration of programs stored in a not-shown ROM (read only memory) within the controller 45.

FIG. 2 is a diagram schematically showing an exemplary software configuration of programs stored in a not-shown ROM (read only memory) within the controller 45. As shown in FIG. 2, the controller 45 at lest stores a control program 20 that includes a program guide generator 21 for selecting relevant templates in response to a request for program guide display and compiling the selected templates into a complete program (or a hypertext) describing a picture to be displayed as detailed later; a markup language driver 22 for for interpreting and executing the compiled program; and an operating system 23 for letting the control program 20 and the markup language driver 22 be executed in order to be able to utilize a suitable one of existing markup language drivers as the markup language driver 22, it is preferable to use a standard hypertext description language such as HTML (Hyper Text Mark-up language), SGML (Standard Generalized Markup Language), MHEG (Multimedia and Hypermedia Expert Group), XML (Extensible Markup Language), etc. in writing the templates. The operating system 23 may be any suitable one either tailored or standard.

The computer 21 in the broadcasting station also stores information on each of the subscribers including subscriber's name, age, sex, address, hobby, preferences and so on. Based on such information, the broadcasting party can create and store various templates with which a program guide can be displayed in a variety of forms in the subscriber terminal 4.

Hierarchical Templates

For the sake of better understanding the invention, we first introduce

Figure 3:
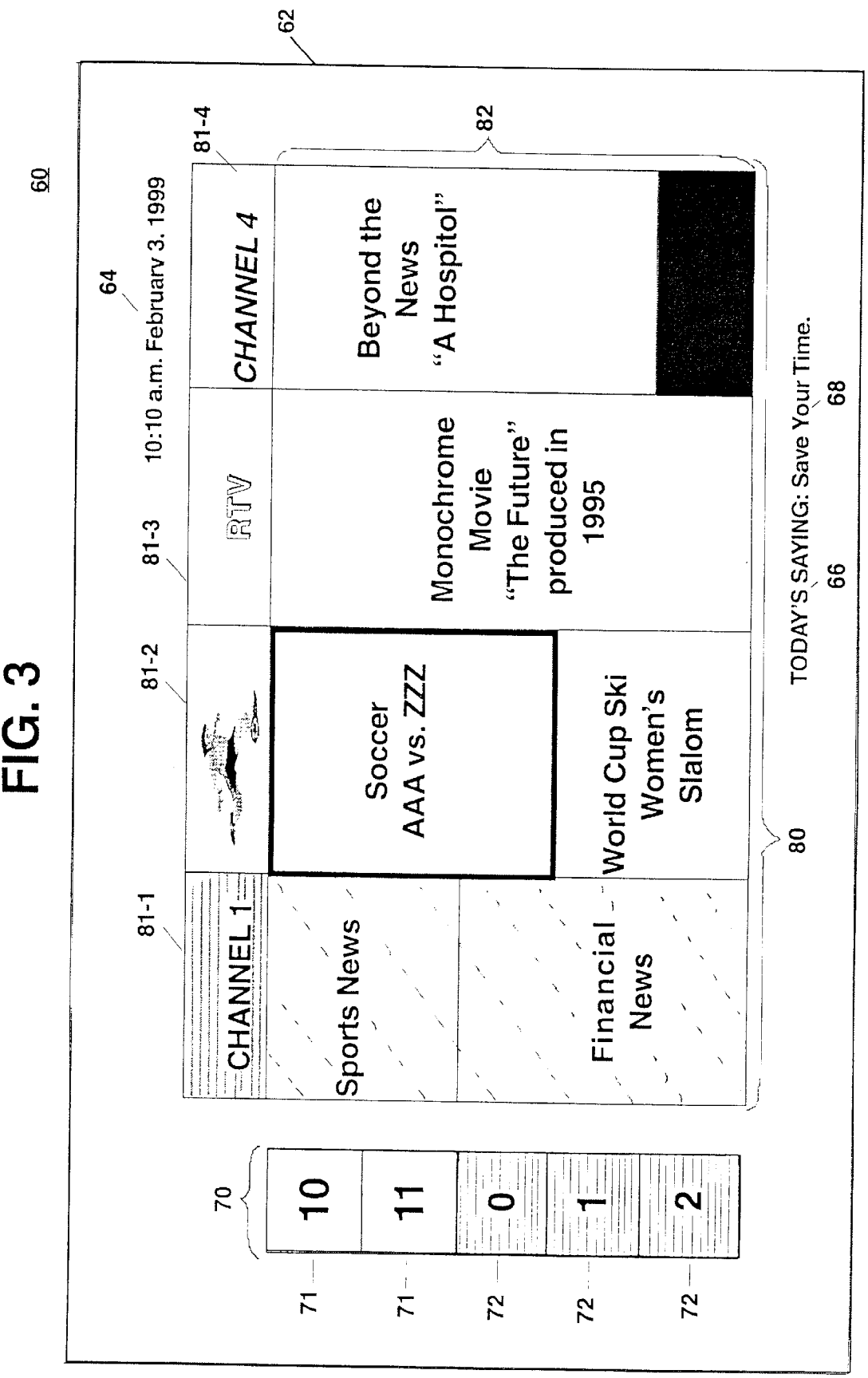
FIG. 3 is a diagram showing an example of a program guide in a table format displayed on a screen of a normal aspect ratio in accordance with the principles of the invention.

A specific example of a program guide displayed in a table format on a screen with, for example, a normal aspect ratio (4:3) at 10:10 a.m. Feb. 3, 1999 in accordance with the principles of the invention as shown in FIG. 3. In the figure, it is assumed that the viewer is 16 years old and likes soccer as for the sports and that the today's saying is "Save Your Time." The table-format program guide 60 comprises a main frame 62 that defines the overall frame. The main frame 62 contains a time axis frame 70 for providing the time scale or axis of the program timetable and a channel guide frame 80. The time axis frame 70 contains a predetermined hour number of time display components 71 and 72 for morning and afternoon, respectively. In the top row of the channel guide frame 80, there are arranged a predetermined channel number (4 in this specific example) of channel name cells or components 81-1 through 81-4 for the channels $CH_1$ through $CH_{1+3}$ (i is a channel number assigned to each channel). Here, $CH_1$ is a channel No. It should be noted that the channels $CH_1$ through $CH_{1+3}$ are not necessarily continuous channels but may be discontinuous in channel number. The channel guide frame 80 further contains program cells 82.

Figure 6:
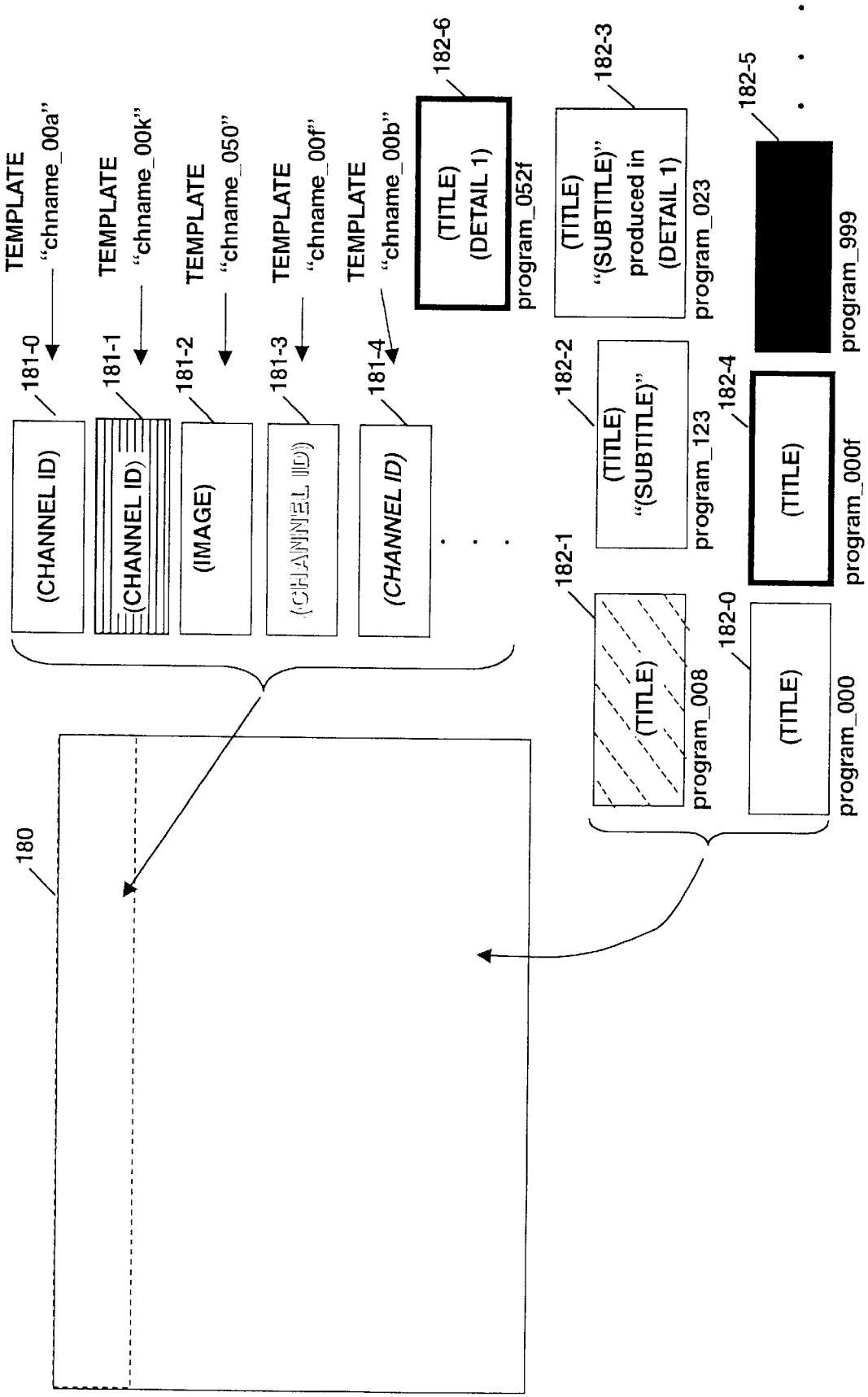

In order to efficiently display the above-mentioned various components, these components are generated from a limited number of organized templates as shown in FIGS. 4 through 6. In FIGS. 4 through 6, an expression in which a variable is parenthesized with the parentheses "(" and ")" is to be replaced with the value of the variable. Most of the variables are field names of a program information table (detailed later) generated from the program information (or EPG data) broadcast from the broadcasting station 2.

FIG. 4 is a diagram showing the concepts of a table from template 162 for the main frame 62. In FIG. 4, the table from template 162 contains an indication of the current time and date, 64, an indication "TODAY'S SAYING:" 66 and an indication of the saying "Save your time" 68 following the indication 66. The values of the current time and date 64 field and the today's saying 68 field are filled by the program 20 when the template 162 is compiled with other constituent templates (detailed later) by the program 20 in response to a request from the user.

As seen from FIGS. 5 and 6, there is a time axis template 170 for the time axis frame 70; time display templates 171 and 172 for the time display components 71 and 72 for morning and afternoon, respectively; a channel guide template 180 for the channel guide frame 80; various channel name templates 181 for the channel name components 81; and various program templates 182 for the program cells 82.

Figure 7:
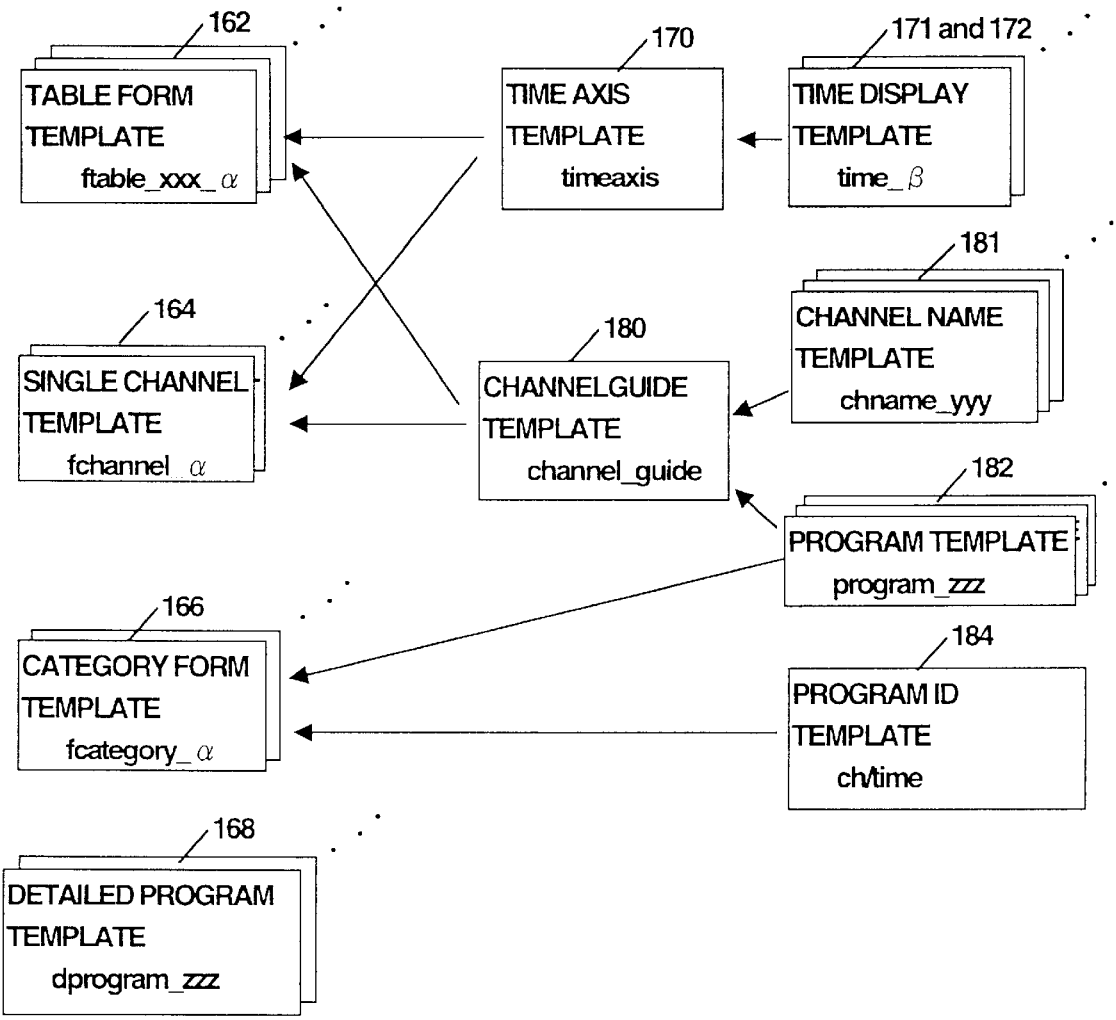
FIG. 7 is a diagram showing an exemplary template set of templates prepared by the broadcasting party in accordance with the principles of the invention.

In the same manner, program guides is displayed in any of a signal channel format, a category-oriented format and a detailed format for a single program. FIG. 7 is a diagram showing an exemplary template set of templates prepared by the broadcasting party in accordance with the principles of the invention.

In FIG. 7, a lower case expression at the bottom of each template box indicates an exemplary template ID(s) assigned to the template(s) of the box. The above-mentioned templates have, for example, the following IDs:

| | |
|---|---|
| the table-form templates 162 | ftable_xxx_α |
| the time axis template 170 | timeaxis |
| the time display templates 171 and 172 | time_β |
| the channel guide template 180 | channelguide |
| the channel name template 181 | chname_yyy, and |
| the program templates 182 | program_category. |

In the above examples of template IDs, the suffix "α" is used to classify the templates of the kind into a plurality of classes according to the aspect ratio and the size of the display screen. Specifically, if the value of α is N, W or S, then the template is for the screen with the normal aspect of 4:3, the wide aspect of 16:9, or a size not larger than a predetermined size, say, 15 inches, respectively. Doing this provides program guide displays suited for the display screen used in the user's television set. In addition, it is of course possible to classify those template into more sizes. Further, if the screen is of the wide aspect ratio, the subscriber terminal 4 may be controlled to display a smaller size program guide together with the on-going television program, instead of displaying a lager size program guide alone.

The suffix "β" is used to classify the time display templates into morning use (171) and afternoon (172) use by substituting β with a suitable character (e.g., "M" for morning and "A" for afternoon). This enables the time indications for morning to be displayed in a white or bright background and the time indications for afternoon to be displayed in a stripe or dark background.

The IDs of the table-form templates 162 include a term "xxx". This permits the broadcasting party to create various versions of table from templates 162 and identify the versions by using, for the term "xxx," a code unique to each of the versions. For example, according to the principles of the invention, the broadcasting party creates a default table-form template with the valid term set infinite in the name of, e.g., ftable_def_α. The broadcasting party may also create a table-form template for Christmas with the valid term set for a Christmas period in the name of, e.g., ftable_xma_α. In this case, the template ftable_def_α is used for a program guide in a table form as long as no template exists which has a valid term that includes the current time. However, if the current time is included in the valid term of the template ftable_xma_α, then the template ftable_xma_α is used. The valid term may be set to any short period. If there are a plurality of templates whose valid terms overlap, then the template with the shortest valid term is used.

In this way, the broadcasting party is permitted to creates various templates for use in specific cases, including, in each of the various templates, a description of condition(s) defining the specific case. However, there may be a plurality of such table from templates 162 whose conditions are met at the same time, In this case, if those conditions are of the same kind or comparable with each other, the subscriber terminal 4 is preferably configured to select the template that has the most strict condition. If the broadcasting party are to create a plurality of templates whose conditions may be met at the same time, the broadcasting party preferably assigns a priority order to each of such templates and including, in each of such templates, a description of the priority order assigned to the template. Doing this enables the subscriber terminal 4 to select one of the templates whose conditions may be met at the same time according to the priority orders. It is noted that the length of the code "xxx" may be arbitrary set.

The subscriber terminal 4 also stores, in the nonvolatile memory 46, information used in the channel name templates 181 for displaying the title cells 81. The information is preferable stored in the form of a table 90 as shown in FIG. 8. In FIG. 8, each record of the table 90 comprises at least the fields of, for example, CHANNEL (or SERVICE) No. 91, NAME 93 of the channel, the variable portion "yyy" 95 of the channel name template "chname_yyy" 181, and AGRUMENTS 97 that contains, if any, arguments to be passed to the template. The arguments field 97 may contain, for example, "N" (for name) or an "actual value" to be displayed in the channel title cell 81, "L" (for logotype) and/or "I" (for image) depending on the type "yyy" of the channel name template to be used. In case of channel 0001 and 0004, the values of respective NAME fields 93 are passed to the channel name templates "chname_00k" and "chname_00b," respectively because ARGUMENTS=N in field 97. In case of channel 0002, since ARGUMENTS=I, an image file name, say, "i0002.gif" will be passed to the channel name template "chname_050." Since the ARGUMENTS field 97 contains an actual data "RTV" in case of channel 0003, the data "RTV" is passed as it is to the channel name template "chname_05f." If the ARGUMENTS field 97 of a channel "????" contains "L" though it is not shown in FIG. 90, a logotype file name, say, "1????.gif" will be passed to the channel name template associated with the channel ????.

In this way, using the table 90 enables the channel name displays of the same format to be achieved by using an identical template while giving variety to the display of the channel titles or names.

FIG. 9A is a diagram showing an exemplary structure of the above-mentioned program information table 100 formed by using the EPG data broadcast from the broadcasting station 2. In FIG. 9A. the program information table 100 includes the fields of, for example, the CHANNEL No. 91, PROGRAM (or EVENT) No. 92, TITLE 101, BROADCASTING TIME AND DATE 93, DURATION 94 of the program, SUBTITLE 102 (optional), CATEGORY CODE 103, SUBCATEGORY CODE 104 (optional), DETAILS-1~3 105 through 106, further DETAILS-4, -5, . . . (108) (optional), and RATING 109 (optional) detailed later. FIG. 9B is a diagram showing a part of the program information table 100 of FIG. 9A.

Figures 10, 11:
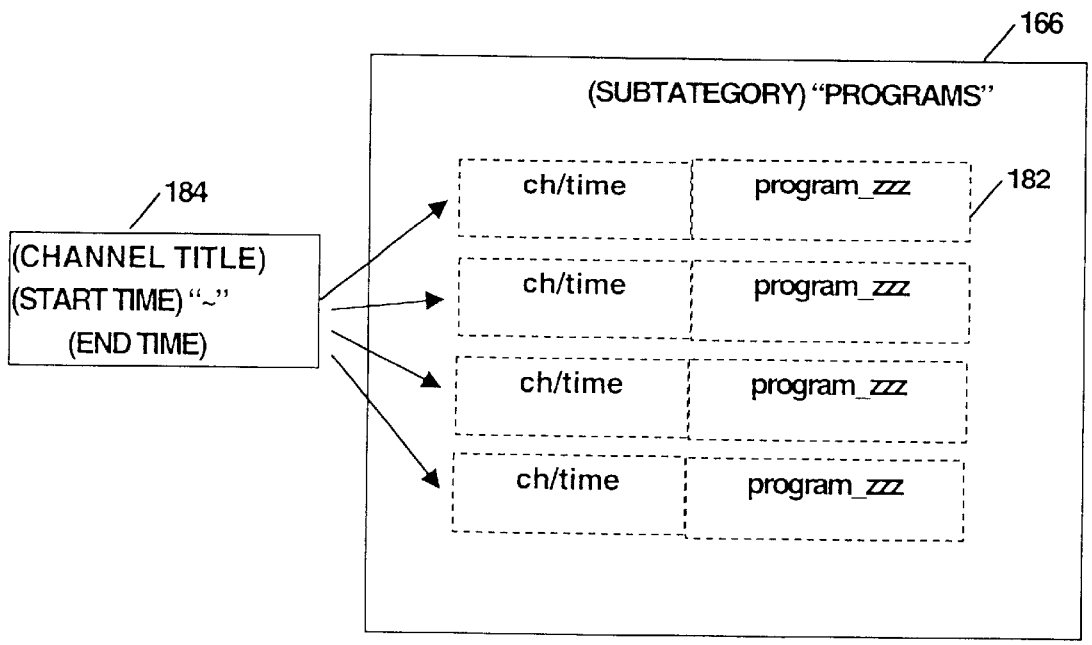
FIG. 10 is a diagram showing an exemplary structure of a table for use in selecting a suitable one from program templates 182 or from detailed program templates 168.
FIG. 11 is a diagram showing an exemplary way of displaying a category-oriented program guide in accordance with the principles of the invention.

FIG. 10 is a diagram showing an exemplary structure of a table 130 for use in selecting a suitable one from program templates 182 or from detailed program templates 168. In FIG. 10, the table 100 has the fields of, for example, CATEGORY 103, SUBCATEGORY 104, SUBCATEGORY NAME 110 which contains a name indicative of category and/or subcategory, zzz 112 which is a component of the ID of the program template 182 (and detailed program template 168 detailed later), and FAVORITE 114 indicative of whether the category defined by the fields 103 and 104 is favored by the user.

From FIGS. 10, it is seen that the program templates "program_123" (182-2 in FIG. 6), "program_023" 182-3 and "program_046" (not shown) are to be used for the programs "Beyond the News", "Monochrome Movie" and "World Cup Ski", respectively. For the two news of channel 1, an identical program template "program_008" 182-1 can be used. Since the presence of a code "F" in the FAVORITE field 114 indicates that the user likes the programs characterized by the category codes "SP" and "18", a highlight version of the program template "program_052" (not shown) is used, i.e., the program template "program_052f" 182-6 is used.

In this way, a program guide is displayed in a suited form for each program.

In the program information table 100, the RATING field 109 contains any of a code indicative of the degree of sexual and/or violent expressions, the minimum age over which viewing the program is permitted or the minimum age under which viewing the program is prohibited. If the viewer is under the age over which viewing the program is permitted, then the program template "program_999" 182-5 of FIG. 6 is user for the program. In this way, it is possible to conceal the program guide for a program the viewer is not qualified for.

Though we have described the invention in connection with a program guide of a table format, a program guide for a single channel CHi is also displayed by using a single channel template 164 as an overall frame template; embedding the above-described channel guide template "channelguide" 180 in the single channel template 164 (in this case, a channel count argument that is passed to the template "channelguide" is set to one); and further embedding a channel name template "chname_yyy" associated by the table 90 of FIG. 8 with the channel CHi and program templates "program_zzz" associated by the table 130.

FIG. 11 is a diagram showing an exemplary way of displaying a category-oriented program guide in accordance with the principles of the invention. In FIG. 11, one of the category form templates 166 which is suited for the aspect ratio and the size of the screen is used. The template 166 includes the indication of (SUBCATEGORY NAME) 110 and the indication "PROGRAMS" following the former. The templates 166 further includes a column of pairs of a program ID template "ch/time" 184 and a program template "program_zzz" 182 with the latter 182 concatenated to the former 184. The program ID template "ch/time" contains the variables of CHANNEL TITLE 101, START TIME (not shown) and END TIME. The values of these variables are obtained from the table 100.

Also, using a detailed program template "dprogram_zzz" 168 yields a detailed program guide for a specified program. The detailed program templates 168 are detailed versions of the above-detailed program templates 182. The selection of detailed program template 168 is achieved in the same manner as in case of a program template 182.

Examples of Templates

Some examples of above-described templates will be given in the following. In these specific examples, the templates are written in a combination of a hypertext description language like HTML and a language specific to the program guide generator 21 of FIG. 2. It should be noted that the hypertext description language is not limited to HTML but may be any suitable language. Also, the specifications of the latter language may be freely determined at the designer's own will.

(1) A template usually used (not in special occasion) for a display screen of the normal aspect (i.e., "ftable_def_N"):

```
<&template NAME="TABLE-Form Template">
<p ALIGN="right">
<@get_nowtime>
</p>
<frameset COLS="10%,90%">
<&frame name="Time Axis Template", SRC="timeaxis",
    STARTTIME=<@get_now_hour>, ENDTIME=<@get_now_hour>+5>
<&frame name="Channel Guide Template", SRC="channelguide",
    STARTTIME=<@get_now_hour>, ENDTIME=<@get_now_hour>+5
    START_CHANNEL=<@now_channel_no>, CHANNEL_COUNT=4>
</frameset>
<p ALIGN="right">
TODAY'S SAYING: <@get_todaysaying>
</p>
</template>
```

(2) The time axis template, i.e., "timeaxis":

```
<&template NAME="Time Axis Template", starttime=<@arg1>,
    endtime=<@arg2>
<table>
<&loop ?val, start=?starttime, end=?endtime, ?val=?val+1>
<TR>
<TD>
<&if?val lt 12>
<&frameset ROWS="100%" SRC= "time_M" HOUR=?val>
<&else>
<&frameset ROWS="100%" SRC= "time_A" HOUR=?val>
<&else>
</&fi>
</TD>
</TR>
</&loop>
</table>
</&template>
```

(3) The time display template for afternoon, i.e., "time_A":

```
<&template NAME="Time Display Template for Afternoon"
       BACKGROUND="stripes.gif" displaytime=<@arg1>>
?displaytime
</&template>
```

(4) The channel guide template, i.e., "channelguide":

```
<&template NAME="Channel Guide Template" starttime=<@arg1>
    endtime=<@arg2>start_channel_no=<@arg3>
    channel_count=<@arg4>
?channel_no=?start_channel_no
<TABLE>
<&loop ?val start=1, end=?channel_count, ?val=?val+1>
<TR>
<TD>
<frameset ROWS="10%,90%">
?chname_yyy=<@get_channel_name_tm ?channel_no>
<&frame name="Channel Name Template",
    SRC=?chname_yyy,
    CHANNEL_NUMBER=?channel_no>
<&frame name="Program Template",
    CHANNEL_NUMBER=?channel_no>
    starttime=?starttime, endtime=?endtime>
?channel_no=<@get_nextchannel_no ?channel_no>
</TD>
</TR>
</&loop>
</TABLE>
</&template>
```

(5) The channel name template of the type used for, e.g., channel 1 (it is assumed that channel 1 is associated with a type code "00k" in the table 90 of FIG. 8, that is, a template "chname_00k" is used for channel 1):

```
<&template NAME="Channel Name Template"
    BACKGROUND=stripe.gif, channel_no=<@arg1>>
<@get_name ?channel_no>
</&template>
```

(6) A highlight (or favorite) program template "program_052f" 182–6:

```
</&template NAME="Program Template"
    MARGINWIDTH=10, program_no=<arg1>>
<@get_program_title ?progam_no>
<p>
<@get_detail_1 ?program_no>
</&template>
```

(7) The display-suppressed (or viewing-prohibited) program template "program_999" 182–5:

-continued

```
</&template NAME="Viewing-Prohibited Program Template",
    BACKGROUND="black">
</&template>
```

Figures 12, 14:
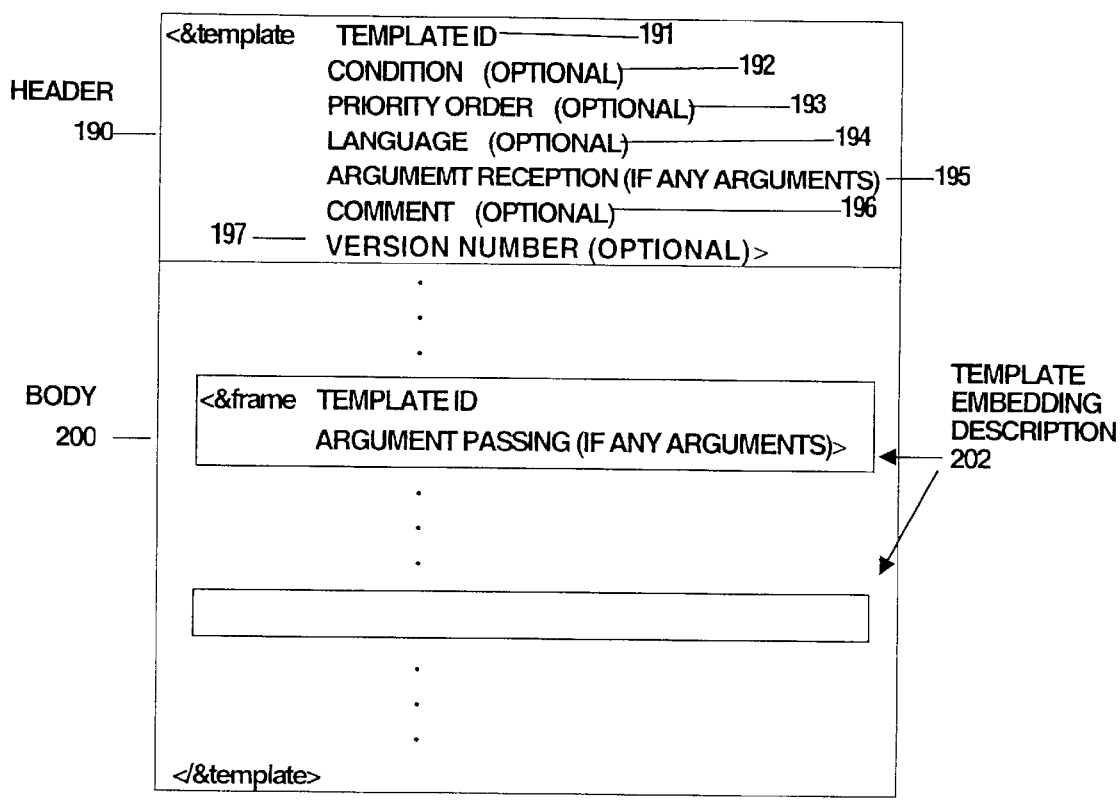
FIG. 12 is a schematic diagram conceptually showing an exemplary arrangement of templates of a type in which at least one other template is embedded.
FIG. 14 is a diagram showing exemplary items of personal data for at least the subscriber which data are stored either in the nonvolatile memory 46 or the IC card 51.

FIG. 12 is a schematic diagram conceptually showing an exemplary arrangement of templates of a type in which at least one other template is embedded, that is, templates to which an arrow points in FIG. 7. In FIG. 12 and in the above-presented examples of templates, each template comprises a header (190 in FIG. 12) put between, e.g., "<&template" and ">" and a body (200) that follows the header and ends with an end code </&template> for example. In this specific example, a notation "<&" is used as a tag for the control codes specific to the above-mentioned program guide generator 21.

The header 190 at least contains a template ID 191 of its own. The header may optionally include the above-mentioned description of condition 192 under which the template is used (e.g., a valid term indicative of a valid time period of the template), the above-mentioned priority order 193, a language 194 used in the text to be generated through the template, argument reception equation or statement 195 (if any arguments), and comments 196. A statement like BACKGROUND="white" specifies the color of the area described by the template.

In the body 200, strings beginning with a character "?" are variables. Portions of the form "<@ . . . >" are internal functions of the program guide generator 21.

The templates in which at least one other template is embedded has at least one template embedding description 202 corresponding to the embedded template(s). Each template embedding description 202, which is put between "<&frame" and ">", contains the template ID of the template to be embedded and, if there is any argument, argument passing statement. The template ID is specified by the expression "SRC=" in this example.

In the above exemplary templates, there are used the following internal functions and control codes:

It is noted that the template that has no other template embedded has no template embedding description 202.

Program Guide Display Operation in the Subscriber Terminal 4

If the user issues a program display command by probably pressing a predetermined button of the man-machine IF 4 or on the remote controller 49 while watching the television, the controller 45 begins an operation for table-format display from the current channel, single channel display for the current channel, or detailed program guide display for the current program according to the design. (A category-oriented display is provided when the user issues a program display command with a category specified.) The table-format display operation is first detailed in the following.

Figure 13:
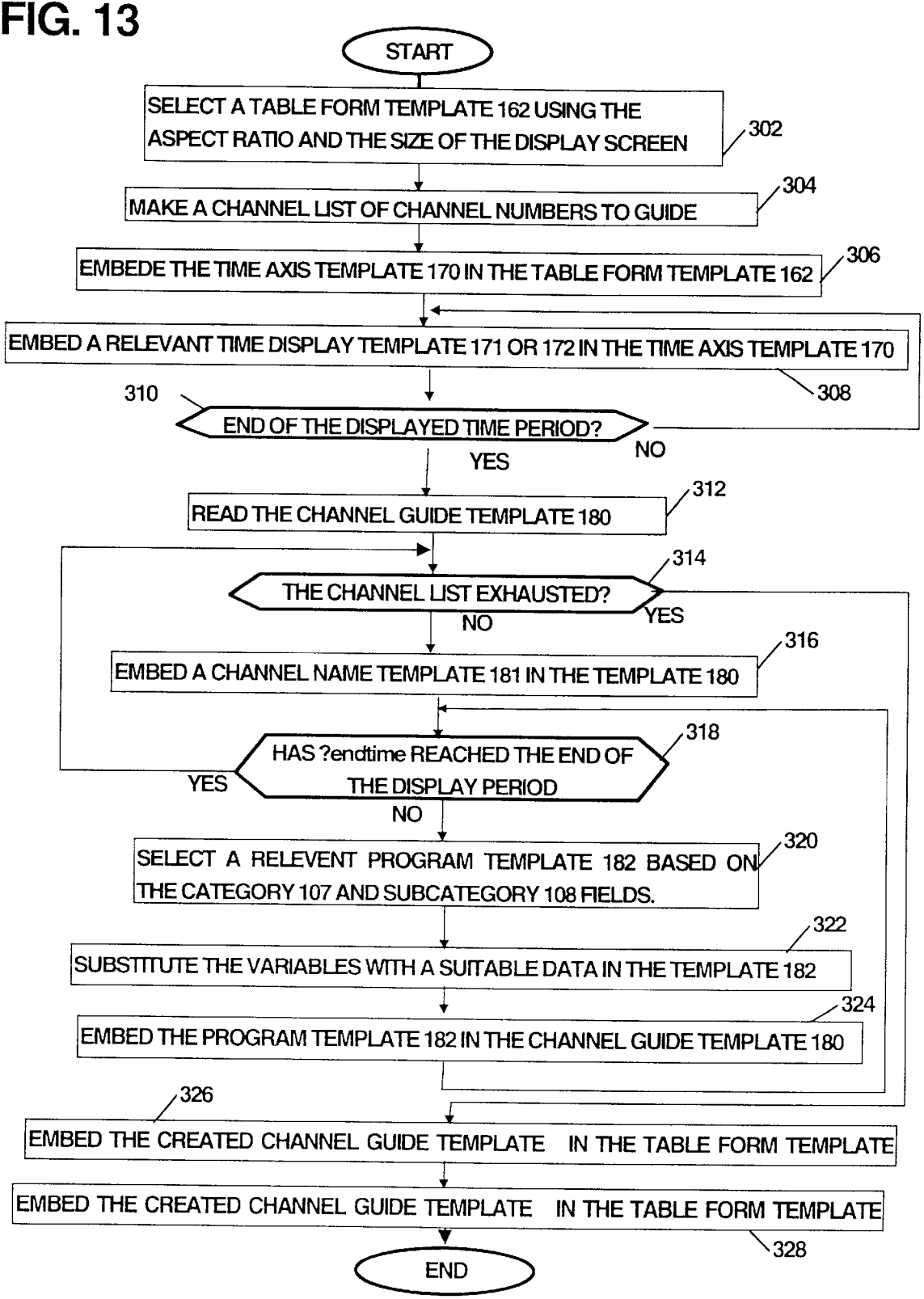
FIG. 13 is a flowchart showing an exemplary table format program guide display operation executed by the controller 45 in accordance with the principles of the invention.

FIG. 13 is a flowchart showing an exemplary table-format program guide display operation executed by the controller 45 in accordance with the principles of the invention. In step 302, the controller 46 selects a suitable table-form template 162 based on the aspect ratio (normal or wide) and the size of the display screen of the user. In this case, if a plurality of templates are selected, the controller 45 examines the conditions 192 (e.g., the valid terms) in the headers 190 of the templates to see if there are any templates the conditions 192 of which are met at the same time (or the valid terms of which include the current time and date for example). If so, the template with the most strict condition (e.g., the template with the shortest valid term) is used if the selected templates have no priority orders 93 in their headers 190. If the selected templates have priority orders 93 in their headers 190, the template with the highest priority order is used. In this specific example, it is assumed that the default table-form template 162 of the normal aspect ratio and of the size larger than 15 inches, i.e., "ftable_def_N" is used.

It is also noted that the condition 192 may include conditions on the viewer's personal data such as his or her age, sex, the area where he or she is living, whether the

```
<@get_nowtime>                         return current time and date,
<@get_now_hour>                        return the number of hours in the current time,
<@now_channel_no>                      return the channel number of currently selected channel
<@get_todaywords>                      return the saying for the day (detailed later)
<@arg1>, <@arg2> . . .                 return the first, the second arguments, and so on,
<@get_nextchannel_no ?channel_no>
                                       return the channel number of the next channel in a displayed
                                       channel queue (described later),
<@get_program_title ?program_no>
                                       return the program title 103 of the program whose channel No.
                                       is ?program_no,
<@get_detail_1 ?program_no>
                                       return the value of the DETAIL_1 field 110 of the record for
the program whose channel No. is ?program_no in the program information table 100,
<&loop four arguments> statements </&loop>
   repeat the statements by using the first through fourth arguments as a loop variable,
   the initial and end values of the loop variable, and the increase unit in each loop,
   and
<&if [condition]> X <&else> Y </&else></&fi>
   execute X if [condition] is true, and execute Y otherwise.
``` viewer has eyesight or aural disorder, etc. That is, the broadcasting party can cause the subscriber terminal 4 to use a broadcasting party-desired template according to such condition. For this purpose, the subscriber terminal 4 may store in the nonvolatile memory 46 personal data for at least the subscriber (or each member of the subscriber's family) as shown in FIG. 14.

In step 304, the controller 45 makes a channel list (not shown) containing channel numbers of the current channel (the channel the user is viewing) and three subsequent channels. In step 306, the time axis template 170 is embedded in the table-form template 162, setting a loop variable ?val to the number of hours in the current time. In step 308, the controller 45 embeds the morning time display template 171 in the template 170 if the variable ?val is less than 12, and embeds the afternoon time display template 172 in the template 170 otherwise. In step 310, a test is made to see if the end of the displayed time period (five hours from the current time) is reached. If not, the control is returned to step 310. If so, then the control is passed to step 312. In step 312, the controller 45 reads the channel guide template 180.

In step 314, a test is made to see if the channel list is exhausted. Since the result is NO in this case, the control is passed to step 316, where the channel name template 181 associated by the table 90 with the first channel No. in the channel list is embedded in the template 180, and the channel No. is removed from the channel list.

In step 318, a test is made to see if the variable ?endtime has reached the end of the display period. If the test result is NO in step 318, then the controller 45 proceeds to step 320 to select a program template 182 associated by the table 130 with a combination of the category 103 and the subcategory 104 fields of the current program in step 320. In step 322, the controller 45 substitutes the variables in the selected program template 182 with date obtained from the program information table 100. In step 324, the controller 45 embeds the filled program template 182 in the channel guide template 180, and returns to step 318.

If the test result is YES in step 318, then the control is passed to step 314. If the test result is YES in step 314, then the control is passe to step 326, where the controller 45 embeds the created channel guide template (correctly, a hypertext) in the table-form template 162. In step 328, the controller passes the completed table-form channel guide template (correctly, a complete hypertext) to the markup language driver 22 to display a table-form program guide for four channels and 5 hours including the current program.

It should be noted that the controller 45 first checks the RATING field 109 of the program information table 100 of FIG. 9 to see if the viewer is qualified for the program before referring to the table 130 of FIG. 10. If the user is not qualified for the program, the controller 45 selects the viewing prohibiting program template "program_999" 182-5.

Also, in step 320, if the controller 45 finds a code indicative of a favorite program in the FAVORITE field 114, the controller 45 selects a highlight version of the found program template.

In the same manner, a single channel program guide, a detailed program guide for the current program, and a category-oriented program guide are displayed.

The sayings for use in displaying the above-mentioned today's saying may be stored for one year. Alternatively, a smaller number of saying may be stored and one of them may be selected for each day by using a random number or a modulo function.

Finally, the terminal 4 can print a displayed program guide by using the printer 40.

Modifications

The foregoing merely illustrates the principles of the invention. For example, the above-mentioned embodiment has used channel name templates for displaying the channel names. However, instead of using templates, a channel name display text component that describes the channel name cell 81 may be used for each channel. This is effective if the formats of displayed channel names vary for almost every channel. In this case, the table 90 can be eliminated by including the channel number in each channel name display component like chname0001, chname0001 and so on.

Alternatively, if a lot of channels vary in their displayed channel name cells though there still exist a significant number of channels that can be classified into a moderate number of display types, then both of the above-mentioned channel name display schemes may be mixedly used.

The above-described embodiment has used a highlight version of the found program template in step 320 if the controller 45 finds a code indicative of a favorite program in the FAVORITE field 114. Instead of doing this, each program template 182 is so configured as to include a statement that embeds a tag having any highlighting effect in the resultant text that describes the program guide cell 82. In this scheme, a normal and highlight-use template corresponding to the template presented as (6) is written as follows:

```
</&template NAME="Program Template"
    <&if <@favorite_pro <arg1>>MARGINWIDTH=10</&fi>,
        program_no=<arg1>>
<@get_program_title ?progam_no>
<p>
<@get_detail_1 ?program_no>
</&template>
```

In this example, an expression <@favorite_pro . . . > is a function for making a test to see if a program identified by ?program_no is a one the viewer likes. According to this scheme, there is no need of preparing highlight versions of normal program templates.

It is noted that the broadcasting party is permitted to including any desired information such as commercial or informative message in any of the above-mentioned template (preferably in the frame templates 162, 164, and 166). Also, the included information may be in any form and of any media including sound, movie. The included information may be a code specifying data stored in the terminal 4.

Though the above-described templates have been broadcast from the broadcasting station 2, the broadcasting party or service provider may issue an IC 51 card storing the templates when a customer applies for the subscription. Or, the templates may be supplied to the subscribers in any other suitable manner.

Many widely different embodiments of the present invention may be constructed without departing from the spirit and scope of the present invention. It should be understood that the present invention is not limited to the specific embodiments described in the specification, except as defined in the appended claims.

What is claimed is:

1. A set of hierarchical text templates supplied from a broadcast station for use in displaying a program guide by using program information broadcast from the broadcast station, the set of templates including:

a plurality of frame templates for each describing an overall layout of said program guide;

channel name templates of different types into which display manners of possible channels are classified, each channel name template being for displaying a channel name display section, each channel name template being to be embedded in one of said frame templates eventually; and program templates for each displaying a program information for a single program, each program template being associated with one of categories into which possible programs are classified, each program template being to be embedded in one of said frame templates eventually, wherein said frame templates include:

special frame templates, each being suited for a condition in which the special frame template is to be used, each special frame template including a description of said condition.

2. A set of hierarchical text templates as defined in claim 1, wherein said frame templates includes:

a normal-aspect template suited for displaying programs of a channel number and a time period suited for a normal aspect ratio; and a wide-aspect template suited for displaying programs of a channel number and a time period suited for a wide aspect ratio.

3. A set of hierarchical text templates as defined in claim 2, wherein said templates further includes a template suited for displaying programs of a channel number and a time period suited for a display screen size smaller than a predetermined size.

4. A set of hierarchical text templates as defined in claim 1, further including highlight versions of said program templates, each of said highlight versions providing a highlighted display to attract an attention of a viewer.

5. A set of hierarchical text templates as defined in claim 1, wherein each of said special frame templates is suited for an event in a calendar, said special template including a description of a valid term as said condition.

6. A set of hierarchical text templates as defined in claim 1, wherein each of said special frame templates is suited for a condition concerning a personal data of a subscriber which data is stored in a nonvolatile memory within a subscriber terminal, said special frame template including a description of said condition.

7. A set of hierarchical text templates as defined in claim 6, wherein said personal data is the age of said subscriber.

8. A set of hierarchical text templates as defined in claim 6, wherein said personal data is the sex of said subscriber.

9. A set of hierarchical text templates as defined in claim 6, wherein said personal data is the area where said subscriber lives.

10. A set of hierarchical text templates as defined in claim 1, wherein each of said special frame templates include a description of priority order for use in a selection from said special frame templates.

11. A set of hierarchical text templates as defined in claim 1, wherein said templates includes a template for displaying only a filled program display section with no information.

12. A set of hierarchical text templates as defined in claim 1, further including at least one intermediate template for describing a local layout of said program guide, each of said at least one intermediate template being embedded in one of said frame templates.

13. A set of hierarchical text templates as defined in claim 12, wherein said at least one intermediate template includes a time-axis template for describing a section where hours specified by arguments passed from said one of said frame templates are displayed.

14. A set of hierarchical text templates as defined in claim 13, wherein said at least one intermediate template further includes a channel guide template for describing a section where program information for at least one channel specified by channel, channel count arguments and a plurality of hours specified by start and end time arguments is displayed in a table form, said arguments being adapted to be passed from said one of said frame templates, said channel guide template including means for embedding said channel name templates and said program templates.

15. A set of hierarchical text templates as defined in claim 14, wherein said frame templates include a single-channel frame template for describing an overall layout of a single-channel program guide, said single-channel frame template including:

means for receiving said start and end time arguments, and said channel argument;

means for embedding said time-axis template while passing said start and end time arguments; and means for embedding said channel guide template while passing all of said arguments to said channel guide template.

16. A set of hierarchical text templates as defined in claim 14, wherein said frame templates includes a table-form frame template for describing an overall layout of a table-form program guide, said table-form frame template including:

means for receiving said start and end time arguments, said channel argument and said channel count argument;

means for embedding said time-axis template while passing said start and end time arguments; and means for embedding said channel guide template while passing all of said arguments to said channel guide template.

17. A set of hierarchical text templates as defined in claim 1, wherein said frame templates includes a category-form frame template for describing an overall layout of a program guide for programs in a category specified by a category argument supplied from external.

18. A set of hierarchical text templates as defined in claim 17, further including a program ID template for displaying a channel name, a start time and an end time of a program, said program ID template being embedded in pairs with one of said program templates in said category-form frame template.

19. A method of supplying a set of hierarchical text templates for use in displaying a program guide by using program information broadcast from the broadcast station, the method including:

a first step of preparing a plurality of frame templates for each describing an overall layout of said program guide;

a second step of preparing channel name templates of different types into which display manners of possible channels are classified, each channel name being for displaying a channel name display section, each channel name template being to be embedded in one of said frame templates eventually; and a third step of preparing program templates for each displaying a program information for a single program, each program template being associated with one of categories into which possible programs are classified, each program template being to be embedded in one of said frame templates eventually, wherein said first step includes the step of including, in said frame templates, special frame templates, each being suited for a condition in which the special frame template is to be used, each special frame template including a description of said condition.

20. The method as defined in claim 19, further including the step of said broadcast station broadcasting all of said prepared templates.

21. The method as defined in claim 19, further including the step of storing said frame templates, said channel name templates and said program templates in an IC (integrated circuit) card of a subscriber who have newly applied for subscription.

22. The method as defined in claim 19, wherein said first step includes the step of including, in said templates, a normal-aspect template suited for displaying programs of a channel number and a time period suited for a normal aspect ratio; and a wide-aspect template suited for displaying programs of a channel number and a time period suited for a wide aspect ratio.

23. The method as defined in claim 22, wherein said first step includes the step of further including, in said templates, a template suited for displaying programs of a channel number and a time period suited for a display screen size less that a predetermined size.

24. The method as defined in claim 19, wherein said first step includes the step of including, in said templates, a special template suited for use in a certain case, said special template including a description of conditions defining said certain case.

25. The method as defined in claim 19, wherein said first step includes the step of including, in said templates, a template for displaying only a filled program display section with no information.

26. A television subscriber system capable of displaying a program guide by using a set of hierarchical templates supplied from a broadcasting station, wherein the set includes a plurality of frame templates and component templates adapted to be embedded in said frame templates, the television subscriber system comprising:

means for storing said set of templates;

means for permitting a user to issue a program guide request while viewing a program of a channel;

means for determining a form of program guide in response to said program guide request;

means, responsive to said determination, for selecting one of said frame templates which selected one is suitable to said form;

means for generating a text describing said program guide of said form by embedding necessary one(s) of said component templates in said selected frame template while substituting variables of said selected and necessary templates with data which are determined by display conditions and obtained from program information broadcast from the broadcasting station; and means for executing said text to display program guide in said form.

27. A television subscriber system as defined in claim 26, wherein said selecting means includes:

means for obtaining information on a display screen; and means for selecting said one of said frame templates according to said information.

28. A television subscriber system as defined in claim 27, wherein said information includes an aspect ratio of said display screen.

29. A television subscriber system as defined in claim 28, wherein said information includes a size of said display screen.

30. A television subscriber system as defined in claim 26, wherein said component templates includes channel name templates of different types into which display manners of possible channels are classified, each channel name template being for displaying a channel name display section, and wherein said generating means includes means for selecting one of said channel name templates which is associated with a channel number of each of channels to be displayed.

31. A television subscriber system as defined in claim 26, wherein said component templates includes a program template having been prepared for each of categories into which possible programs are classified, each program template being for displaying a program information for a single program, and wherein said generating means includes means for selecting one of said program templates which is associated with a category of each of programs to be displayed.

32. A television subscriber system as defined in claim 31, wherein said generating means includes:

means for making a test to see if a viewer is qualified for each of said programs to be displayed; and means, activated in the event the user is not qualified for one of said programs, for selecting, for said one of said programs, a program template for displaying only a filled program display section with no information.

33. A television subscriber system as defined in claim 31, wherein said generating means includes means, activated in the event it is found that one of said programs to be displayed is of a category the viewer likes, for selecting a highlighted version of said one of said program templates which is associated with a category of said one of said programs.

34. A television subscriber system as defined in claim 26, wherein said frame templates include at least one special frame template suited for use in a certain case, each special template including a description of a condition defining said certain case, and wherein said selecting means includes means, activated in the event that there are two suitable frame templates, one of said two suitable frame templates including said description of said condition and that said condition is met, for selecting a template that includes said description of said condition that are met.

35. A television subscriber system as defined in claim 34, wherein said condition is a valid term.

36. A television subscriber system as defined in claim 34, further comprising means for storing personal data of the subscriber wherein said conditions concerns one of said personal data, and wherein said selecting means includes means, responsive to a detection of one of said frame templates whose condition is met by one of said personal data, for selecting said one of said frame template whose condition is met.

37. A television subscriber system as defined in claim 34, wherein each special frame template includes a description of priority order for use in a selection from said at least one special frame template, wherein said selecting means includes means, responsive to a detection of more than one of said special frame templates whose conditions are met by said personal data, for selecting one of said more than one of said special frame templates that has the highest priority order.

38. A television subscriber system as defined in claim 26, wherein said frame templates include a special template suited for use in a certain case, said special template including a description of conditions defining said certain case, and wherein said selecting means includes means, activated in the event that there are more than two frame templates that are suitable to said form and include such said descriptions of conditions and that said conditions are all met, for selecting a template that includes the description of the most strict conditions.

39. A television subscriber system as defined in claim 26, wherein said frame templates include a special template suited for use in a certain case, said special template including a description of conditions defining said certain case and a description of priority order, and wherein said selecting means includes means, activated in the event that there are more than two frame templates that are suitable to said form and include such said descriptions of conditions and that said conditions are all met, for selecting a template that includes the description of the highest priority order.

40. A television subscriber system as defined in claim 34, wherein said frame templates includes three versions of each of said frame templates including said at least one special frame template, said three versions being a normal aspect ratio version, a wide aspect ratio version and a small size version, wherein said selecting means includes means for selecting one of said three versions of said selected frame template which is suited for a display screen used in or with the television subscriber system.

* * * * *